Dec. 28, 1926.

H. C. ROSS 1,612,059

MILLING MACHINE

Filed Sept. 30, 1921   2 Sheets-Sheet 1

Inventor
Hugh C. Ross
Whittemore Hulbert Whittemore
+ Belknap   Attorneys

Patented Dec. 28, 1926.

1,612,059

UNITED STATES PATENT OFFICE.

HUGH C. ROSS, OF TOLEDO, OHIO, ASSIGNOR TO THE KENT-OWENS MACHINE COMPANY, OF TOLEDO, OHIO, A CORPORATION OF OHIO.

MILLING MACHINE.

Application filed September 30, 1921. Serial No. 504,273.

The invention relates to milling machines and it is the object of the invention to obtain a semi-automatic machine which is particularly adapted for the successive performance on different pieces of work of definite operations, such, for instance, as the cutting of key seats. To this end the invention consists in various features of construction as hereinafter set forth.

In the drawings:

Figure 1 is a perspective view of the machine;

Figure 2:
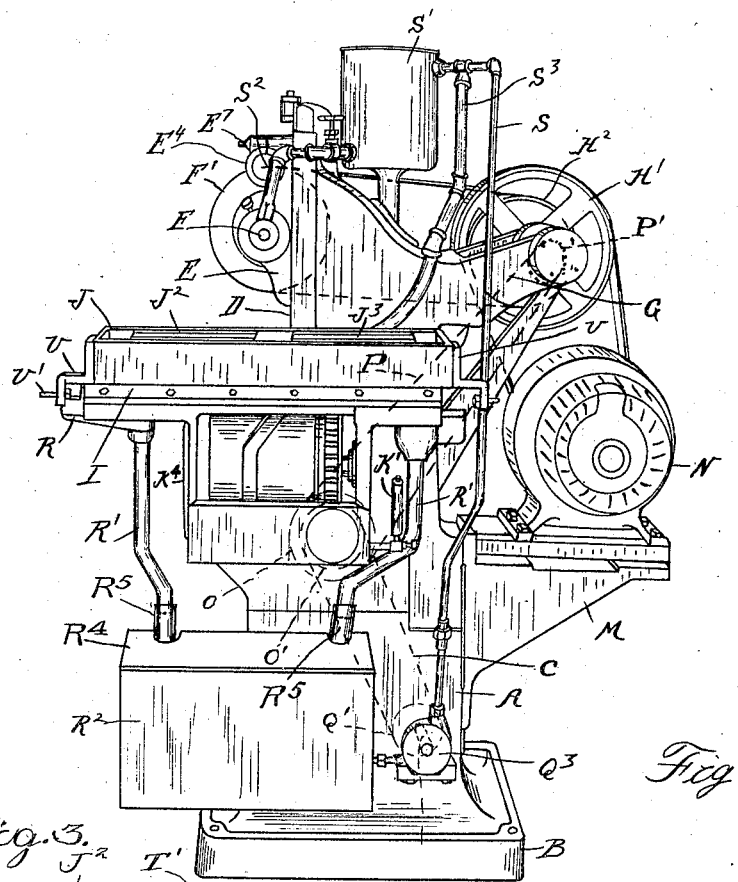
Figure 2 is an end elevation partly in section.
Figure 3:
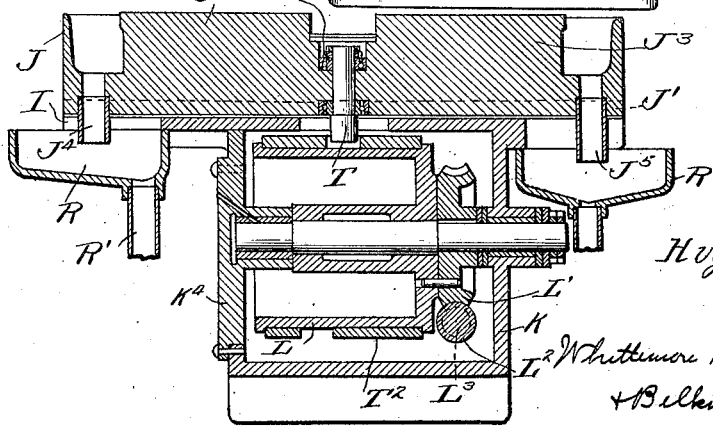
Figure 3 is a vertical longitudinal section through the carriage and its actuating hand.
Figure 2:
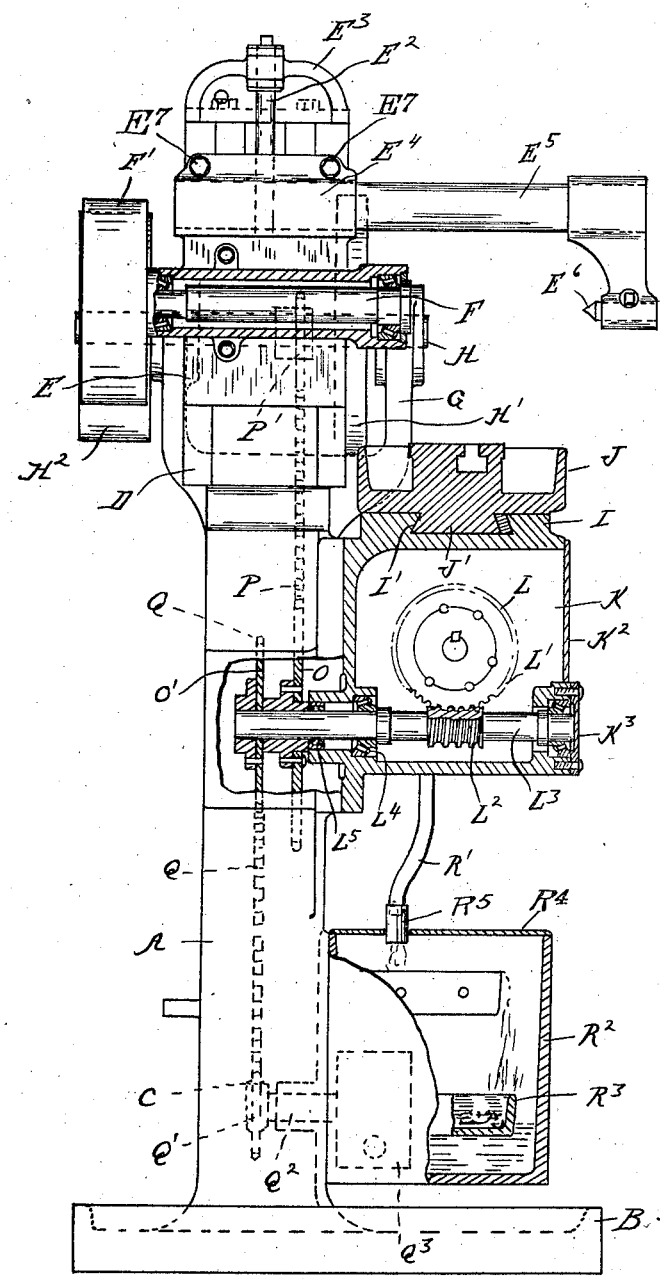

A is the main frame member which is preferably formed integral with a base B and vertical hollow column C. Upon the upper end of this column are the vertical ways D on which is mounted the adjustable head E carrying the arbor F. In rear of these ways are the arms G having bearings at the outer ends thereof for the counter-shaft H. At the front and in a plane transverse to the ways D is secured a bed or table I for supporting a reciprocatory work-carrying table J. The bed I has a housing K beneath the same in which is located a rotary cam L for reciprocating the carriage and on a shelf or bracket M to the rear of the column is mounted a motor N for driving the mechanism.

The mechanism which is driven by this motor comprises the counter-shaft H having thereon a drive pulley or sprocket H' connected by a belt or chain directly to the motor. At the opposite end of the shaft H is a pulley H² which is connected by a belt to a combined pulley and fly-wheel F' on the arbor F. This wheel is of sufficient mass to furnish an inertia element which will steady the operation of the cutter upon the work. The carriage J is arranged beneath the cutter mounted on the outer end of the arbor F and is reciprocated by the cam L, which in turn is driven by a mechanism including a worm gear L' within the housing K, a worm L² in mesh with this gear and upon a worm shaft L³ which extends transversely and into the hollow column C. O and O' are sprocket wheels mounted on the portion of the shaft L which is within the hollow column, the former being connected by a chain P with a driving sprocket P' on the counter-shaft H. The sprocket O' is connected by a chain Q with a sprocket Q' on a shaft Q² extending outward through the column adjacent to the base B and forming the driver for a rotary oil pump Q³.

The work carriage J is supported upon the bed or table I and is guided for reciprocatory movement thereon by a central depending portion J' of dove-tailed cross section engaging corresponding ways I' on the bed. The carriage preferably is provided with two work-supporting blocks J² and J³, which are on opposite sides of the longitudinal center thereof and upon which suitable jigs or work clamps (not shown) may be mounted for holding the work. The supporting blocks are shown as being formed integral with the carriage J though it is not necessary that they be so formed as separate blocks might be used. Surrounding and extending between these blocks is a grooved portion of the carriage for receiving the chips together with the oil or lubricant used upon the cutter. At opposite ends of the carriage are depending discharge tubes J⁴ and J⁵ through which the lubricant, together with some of the chips, is discharged into receptacles R, which in turn are connected by conduits R' with a receiving tank R² supported on the base B. Within this receiving tank are trays R³ for catching the chips while the lubricant is permitted to over-flow the edges of these trays. Any chips which are carried over from the upper tray will be caught by the lower ones and in this way a separation is effected, so that the purified lubricant will find its way to the bottom of the tank. The pump Q³ then withdraws the lubricant from the tank and elevates it through a conduit S to a receiving tank S' from which it is discharged through a conduit S² to the cutter. Any excess of lubricant will pass from the tank S' into the over-flow conduit S³ and thence downward into the channeled work carriage from which it will be discharged, as above described, into the tank R².

The work carriage J is reciprociated through the operation of the cam L in co-operation with a pin T depending from the center of the carriage. This pin is preferably mounted in ball bearings T' so as to be freely revoluble and its lower end is adapted to engage with a groove in the cam, suitably fashioned to produce the desired reciprocation. Preferably this groove is formed by segmental cam plates T², which are mounted upon a cylindrical drum forming the body of the cam L, and the plates are so fashioned that in the rotation of the drum they will impart a longitudinal movement to the carriage. This movement is rapid in the central portion thereof to alternately transfer the work on the blocks J² and J³ into position for engagement with the cutter. The movement is then slowed so as to produce the desired feeding of the cutter into the work until the completion of the cut, after which a rapid movement is imparted to withdraw the work from the cutter and to move the work upon the other block into engagement therewith. Different kinds of work would require different cams, but the drum on which these cam plates are mounted is standard.

The cam is lubricated while in action and preferably a housing K has a lower portion which is constantly filled with the lubricant, the level of which is indicated by suitable means such as the external gauge glass K'. Above the lubricant-holding portion of the housing is a removable cover plate K² which is of sufficient size to provide access to the cams. The worm shaft L³ is inserted longitudinally through an aperture in the housing K, this aperture being closed by a cap K³. Roller bearings L⁴ may be used for the mounting of the shaft L³ and an oil-retaining ring L⁵ surrounding said shaft serves to hold the lubricant from escaping into the hollow column C. The head E which carries the arbor F is adjustably secured to the ways D and vertical adjustment is obtained through the operation of a feed screw E² engaging a threaded socket in said head and having its upper end swivelled in a bracket E³ on the column C. The head E has a cylindrical socket portion E⁴ in which is adjustably secured the rod E⁵ which carries an outer center E⁶. The socket E⁴ is split and clamped by screws E⁷ which serve to hold the rod rigid in different positions of adjustment.

With the construction as described, in operation, the pieces of work which are operated upon are alternately mounted upon the blocks J² and J³. Motion is then imparted to the mechanism from the motor N, which, through the connections described, will reciprocate the work holder J, carrying the work on the opposite blocks J² and J³ alternately into engagement with the cutter on the spindle F. After the operation has been performed on one piece of work and the carriage is returning to move the piece of work into engagement with the cutter, the completed work is removed and a new piece substituted therefor. This transfer can be effected during the interval in which the work is being performed upon the other supporting block and thus the machine can operate continuously.

During the performance of the work the pump Q³ will be in constant operation and will circulate the fluid which is used upon the cutter. This fluid is discharged through the conduit S² directly upon the cutter and will wash away the chips, carrying them into the grooves of the carrier and then through the discharge conduits J⁴ and J⁵ into the receptacles R. These receptacles are of sufficient size to receive the discharge from the conduits J⁴ and J⁵ during the entire reciprocatory movement of the carriage and as the bottoms of said receptacles are sloping, the fluid and the chips will be carried into the conduits R'. These conduits will discharge onto the trays R³ where the liquid is separated from the chips and fills the tank, from which it is again drawn out by the pump Q².

In the performance of certain work, it is desirable to exactly limit the action of the cutter. This is effected by providing the carriage J at its opposite ends with brackets U carrying adjustable stops U' which are adapted to engage with bearings on the bed or table I. These stops may be adjusted in relation to each piece of work so that if there is any backlash in the cam which would permit the same to over-ride the desired movement, stops will limit the action of the cutter.

For access to the cam L the end of the housing K is apertured for the passage of said cam and this aperture is capped by a closure K⁴.

A machine constructed as described can be quickly adapted for any desired semi-automatic operation and in use will perform its work rapidly and accurately. The construction is comparatively simple and easily assembled, thereby decreasing the cost of production.

The series of trays in the tank R² will hold an accumulation of chips, but whenever access is desired to these trays, the cover R⁴ of the tank may be removed and the trays withdrawn therefrom. This operation is facilitated by providing the conduits R' with telescopic extensions R⁵, permitting of drawing the ends of these conduits out of the way when the trays are to be removed.

What I claim as my invention is:

1. The combination with a base, and a column projecting upward therefrom, of a bed supported on said column, a reciprocatory work carriage mounted on said bed, said carriage having a peripheral groove for receiving the lubricant and chips, a discharge conduit from said groove at one end of said carriage, and a receptacle stationary on said bed, of sufficient area to register with said discharge conduit during the entire reciprocatory movement thereof.

2. The combination with a bed, of a reciprocatory work carriage thereon having a peripheral groove for receiving the chips and lubricant, discharge conduits from said groove at opposite ends of the bed, receptacles for the discharge from said conduit stationary with the bed and of sufficient area to remain in registration with said conduits during the entire reciprocatory movement, conduits connected with said receptacles for conveying away the lubricant and chips, a tank for receiving said lubricant and chips, means in the tank for separating the lubricant from the chips, and a pump for returning the lubricant to the work on said carriage.

3. The combination with a base, a column extending upward therefrom, a bed mounted on said column, a reciprocatory carriage slidable upon said bed and provided with a pair of work-supporting blocks with grooves surrounding said blocks for receiving the lubricant and chips, discharge conduits connecting with said grooves at opposite ends of said carriage, receptacles for receiving the discharge from said conduits of sufficient area to remain in registration therewith during the reciprocation of said carriage, a column receiver into which said receptacles discharge, and separating means for the lubricant and chips within said receiver, said means comprising a series of trays removably engaging said receiver and arranged to overflow the liquid from one to another.

4. The combination with a base, of a column extending upward therefrom, vertical ways on the upper portion of said column, a head vertically adjustable on said ways, a transversely extending rotary work arbor journaled in said head, a bed mounted on said column beneath said rotary arbor, a reciprocatory work carrier on said bed, a bracket on said column, a motor mounted thereon, a counter-shaft mounted on said column and driven from said motor, and a drive connection between said counter-shaft and rotary arbor including a combined pulley and fly-wheel on the latter.

5. The combination with a reciprocating carriage and a bed therefor, of a conduit connected to one end of said carriage for discharging lubricant and chips collected thereon, and a receptacle stationary on said bed of sufficient area to register with said discharge conduit during the entire reciprocatory movement thereof.

In testimony whereof I affix my signature.

HUGH C. ROSS.